United States Patent [19]

Smorenburg

[11] 3,950,150
[45] Apr. 13, 1976

[54] METHOD AND DEVICE FOR REMOVING WATER VAPOR

[75] Inventor: Johannes Jacobus Smorenburg, Abcoude, Netherlands

[73] Assignee: Stork Amsterdam B.V., Amstelveen, Netherlands

[22] Filed: Apr. 5, 1974

[21] Appl. No.: 458,258

[30] Foreign Application Priority Data
Apr. 6, 1973 Netherlands .................... 7304868

[52] U.S. Cl. ........................ 55/30; 55/94; 55/223
[51] Int. Cl.² .......................................... B01D 53/14
[58] Field of Search ............. 55/29, 30, 84, 93, 68, 55/21, 25, 94, 223

[56] References Cited
UNITED STATES PATENTS
1,791,086   2/1931   Sperr, Jr. ............................ 55/30
3,283,476   11/1966  Honigh ................................ 55/30
3,577,706   5/1971   Moller ................................ 55/30
3,708,955   1/1973   Ambrose et al. .................. 55/94 X Primary Examiner—Charles N. Hart
Assistant Examiner—Richard W. Burks
Attorney, Agent, or Firm—Alan H. Levine

[57] ABSTRACT

A method and device for removing at low pressures water vapor from a water vapor containing medium, particularly from a stripper steam for stripping edible oils at low pressures, the device comprising at least one absorption vessel with a feed pipe for the sulphuric acid and a nozzle for finely dividing the sulphuric acid, an outlet for discharging the same, a gas inlet and a gas outlet, a sulphuric acid recycling conduit, and a cooling member for removing heat from the sulphuric acid flowing through the recycling conduit.

8 Claims, 2 Drawing Figures

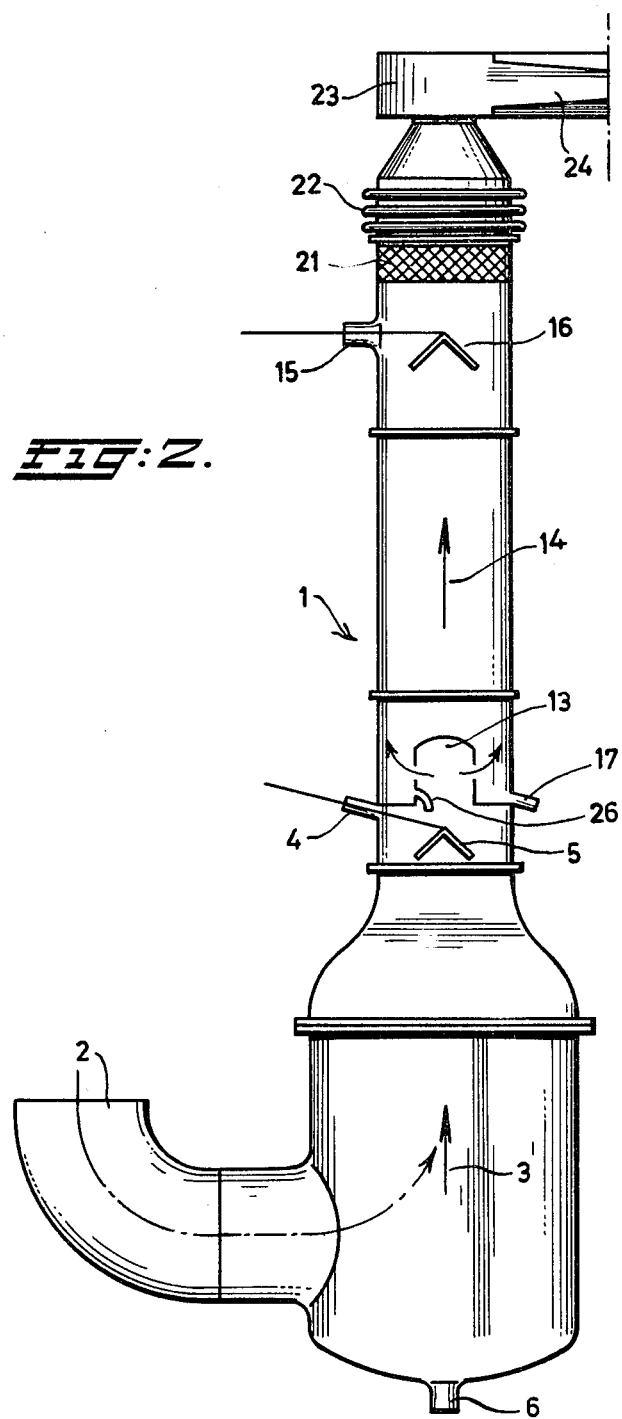
FIG:2.

3,950,150

METHOD AND DEVICE FOR REMOVING WATER VAPOR

BACKGROUND OF THE INVENTION

The invention relates to a method and device for removing at low pressures water vapor from a water vapor containing medium, particularly from a stripper steam for stripping edible oils at low pressures.

It is commonly known to use steam for deacidulation and deodorization by continuous distillation, of edible oils at very low pressures for example of less than the pressure of a 4 mm mercury column. For the continuous removal of the water vapor containing medium, obtained by thus treating edible oils from an apparatus, systems are used so far, comprising steam jet pumps and condensors. The steam containing medium with a very low pressure is brought to a higher pressure in the steam jet pumps, whilst adding driving steam, whereupon the mixture is introduced into condensors after which the products obtained in the shape of water and non-condensable material are discharged by means of pumps.

The driving steam increasing the pressure of the steam containing medium is commensurate to the quantity of the water vapor containing medium to be discharged and depends on the ratio of the pressures before or beyond the steam jet pump or pumps.

When oils are continuously deacidulated and deodorized by distillation at very low pressures of e.g. less than the pressure of a 4 mm mercury column, much steam is required consequently to bring the steam containing medium, coming from the deacidulating and deodorizing treatment by means of distillation to such a pressure that this steam can be condensed by for instance cooling water. The quantity of cooling water required for condensing the steam is very great, however.

Apart from this disadvantage of high operation costs of steam, cooling water, discharge and electricity for pumps, considerable investments are required for steam jet pumps, condensors and pumps.

Besides, a very important disadvantage of these systems consists in that they cause considerable environment pollution, since the water vapor containing medium, obtained by refining edible oils at low pressures, always contains impurities coming from the oil, like e.g. traces of fatty acids, flavouring substances and undesired odor-diffusing substances and the like, which are introduced together with the operative steam from the steam jet pumps into the condensors.

The impurities are likewise condensed by the cooling water in the condensors, so that the large quantities of water leaving the condensors in the form of cooling water with condensed driving steam and condensed stripper steam, are polluted by impurities which, though small in quantity, are intolerable, however. The discharge costs of this polluted water are very high and will presumably get higher in the future. Therefore much interest is excited by a method and device by which environment pollution is avoided and water consumption is decreased e.g. by using an apparatus capable of absorbing water vapor containing medium at low pressures. Some absorption agents with a low partial tension are known in the art, which are capable of absorbing water vapor at low pressures, like e.g. brines. Such absorption means suffer, however, from the disadvantage that their application field is very limited, while moreover their process should be carefully controlled. Finally the investments for such systems are considerable, so that said systems are of no importance in practice.

SUMMARY OF THE INVENTION

The invention aims to provide a method and device not suffering from the aforementioned disadvantages and contributing essentially to the struggle against environment pollution.

This is attained by the arrangement that a method for removing water vapor from a water vapor containing medium at low pressures, particularly a medium produced while stripping edible oils at low pressures, is characterised in that the water vapor containing is brought into contact with fineley divided sulphuric acid whilst recycling this acid.

This method makes it possible to absorb, even at pressures of 1/100 mm mercury column, efficiently and at acceptable costs water vapor from a water vapor containing medium, when edible oils are continuously diacidulated and deodorized by means of continuous distillation. Particularly the following advantages are obtained:

1. the quantity of medium to be removed from the water vapor containing medium after the absorption of the water vapor is considerably less than in the known methods;

2. the quantity of driving steam in the steam jet pumps is considerably lower;

3. the impurities in the water vapor containing medium are absorbed and carried along with the absorption agent and therefore do not pollute the environment;

4. the water from the condensors after the steam jet pumps is no longer polluted and can be discharged without further expenses;

5. by economizing on steam and cooling water it is possible to operate at considerable lower costs;

6. in performing the method according to the invention it is furthermore possible to perform the treatment of the edible oils at pressures lower than the usual ones, e.g. at pressures lower than the pressure of a 0.1 mm mercury column. Accordingly less stripper steam suffices while treatment of the edible oils may also be performed at lower temperatures, which results into other economies.

The sulphuric acid obtained after the absorption can be reused for other treatments of edible oils.

Although the advantages of the method and the device as described hereinbefore manifest themselves particularly when combined with an apparatus for deacidulation and deodorization by continuous distillation of edible oils, it is evident that the scope of the invention is not limited to this subject.

The present invention may find its application in all methods according to which water vapor should be absorbed from a water vapor containing medium at very low pressures of e.g. less than 1 Torr.

In order to obtain the finely divided sulphuric acid used, as described in the aforesaid method this acid is either sprayed, or guided along the wall of an absorption apparatus as a thin layer.

The use of sulphuric acid as a water absorbing agent is known per se. When absorbing, two aspects are of importance i.e.: decrease of the water absorbing ability of sulphuric acid in case of low pressures, caused by the partial tension of the sulphuric acid and the considerable rise of temperature owing to the absorption of water in the sulphuric acid. The rise of temperature is due to both the dilution heat and the condensation heat of the steam containing medium.

When the pressures are very low, the absorption can be performed in an efficient and simple manner with an acceptable quantity of acid relative to the quantity of water to be absorbed. Furthermore a greater excess weight of water can be absorbed in case of pressures of e.g. over 5 Torr.

It is advisable to cause the water vapor containing medium to contact the sulphuric acid in various stages; in consecutive stages a sulphuric acid solution with increasing concentration is used.

Performing the process in more stages offers the advantage, that a quantity of sulphuric acid suffices considerably smaller than in case of absorption performed in a single stage, while the efficiency is the same. The multistage process has moreover the advantage that per stage a smaller quantity of heat need be discharged. A very efficient heat discharge is obtained by discharging the heat outside the contact area, which is possible by using a great circulation output of sulphuric acid in each stage. Such an output of sulphuric acid could give rise to a greater consumption thereof, but this is avoided in the multistage process by introducing the sulphuric acid solution, flowing out of a particular stage, into the consecutive stage, whereby a very efficient consumption of sulphuric acid is acquired. It should be noted that the method of the invention is performed in a non-packed tower.

The method according to the invention can be performed with steam containing media with various pressures, ranging e.g. from 0.01 to 1 Torr and temperatures ranging from −10°C to 50°C. The rise of temperature in the described absorption method amounts only to some degrees Celsius, so that both the concentration of the sulphuric acid and the absolute pressure in a particular absorption stage are constant.

The invention also relates to a device for performing the described method which device is constructed of at least one absorption vessel with an inlet with nozzle for introducing a finely divided sulphuric acid solution, a discharge for discharging the sulphuric acid solution, a gas inlet and a gas outlet and a conduit for recycling the sulphuric acid.

Cooling means, preferably a heat exchanger, may be provided in the recycling conduit for the sulphuric acid solution outside the absorption vessel, for discharging the heat produced during the absorption.

An absorption vessel with at least two inlet pipes with nozzles for supplying a finely divided sulphuric acid solution can be efficiently used, whereby the absorption can be carried out in two stages.

The recycling conduit associated with a particular absorption stage may be provided with an inlet for supplying sulphuric acid with a higher concentration and an outlet for discharging diluted sulphuric acid solution.

According to another embodiment of the described device the absorption vessel comprises various inlets with a nozzle for supplying a finely divided sulphuric acid solution, while at least one recycling pipe is connected with another one. Consequently it is possible to introduce the diluted sulphuric acid solution from a particular stage, produced by absorption, as a new sulphuric acid solution into the recycling pipe of a preceding stage.

It should be noted that for the fine state of division of the sulphuric acid solution at the low absolute pressures mentioned, a wet wall column or a spray column and preferably a spray column are used. The column consists efficiently of glass in connection with the corrosion problem and the vacuum tightness.

The advantage of such a column as compared with e.g. a packed bed column consists in that the loss of pressure in the system is minimal which is an absolute requirement at the low absolute pressure mentioned.

With the device and the method as described above it suffices to use a very small gas blower and condensor for discharging the non-condensable products from the steam containing medium, while furthermore great economic advantages can be gained by a considerable saving on stripping steam and driving steam for the steam jet pumps.

The device in question further allows an alternate arrangement of various absorption vessels and gas blowers in series, thus causing a larger quantity of water vapor to be absorbed by about the same quantity of sulphuric acid than in a device with only one absorption vessel and one gas blower, since the pressure in the contact areas and therefore the water absorbing capacity of the sulphuric acid solution in the series of absorption vessels and gas blowers arranged in this manner, increases gradually.

Impurities in the condensation product are entirely avoided with the said method and device since impurities in the steam containing medium are absorbed by the sulphuric acid and carried along with the absorption agent. The diluted sulphuric acid coming from the absorption may be used in the starting phase of the oil treatment.

SURVEY OF THE DRAWINGS

FIG. 2 is a schematic section through an absorption column of the device, likewise consisting of two stages.

Figure 1:
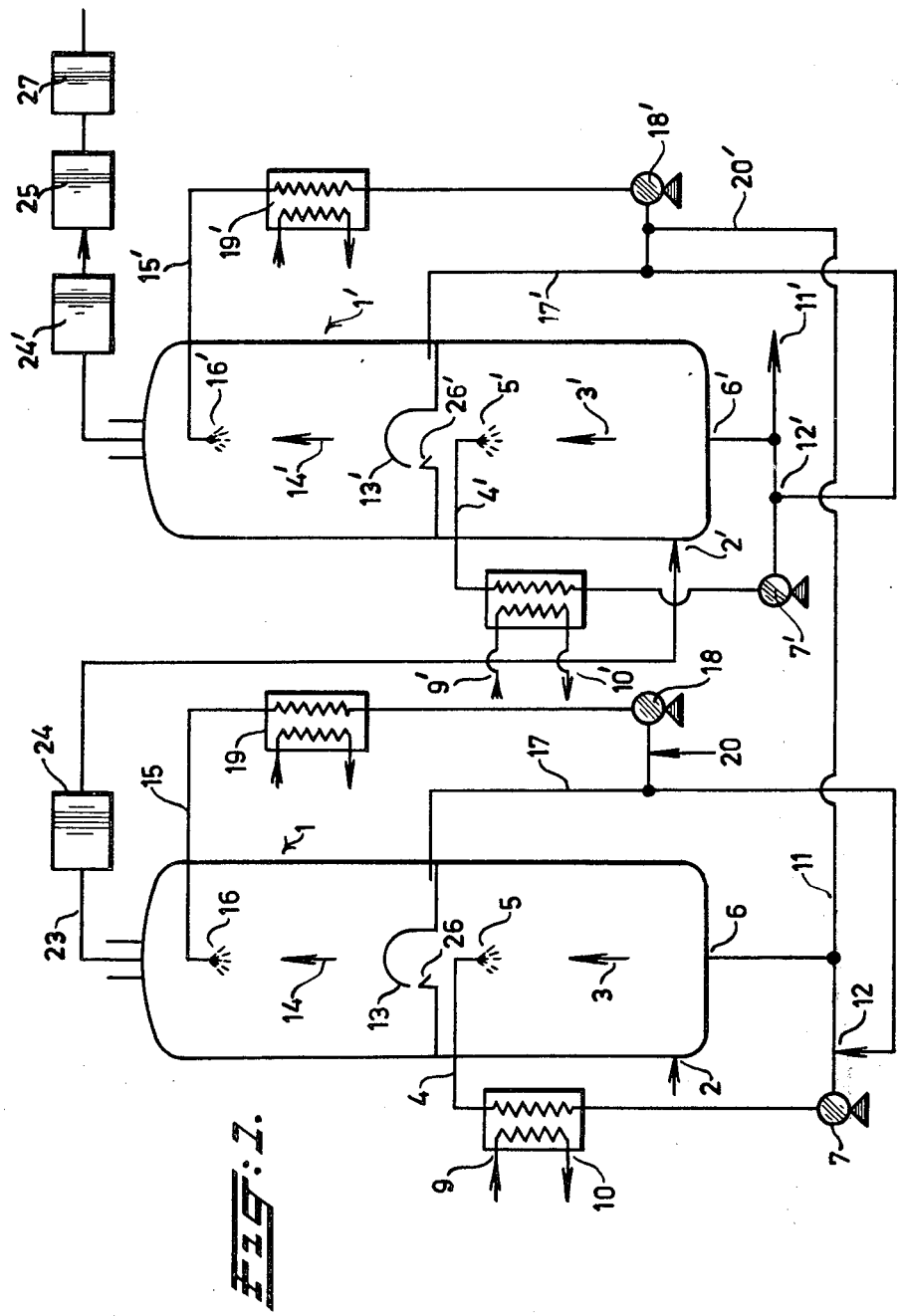
FIG. 1 is a general operative scheme of an embodiment of the device.

The number of stages can be extended in a simple manner by merely expanding the absorption vessel and to provide it with the required supply- and discharge pipes and recycling conduit.

DESCRIPTION OF PREFERRED EMBODIMENTS

In FIG. 1 a device is shown with two absorption stages. This device comprises an absorption vessel 1 with an inlet 2 through which a steam containing medium from which water vapor should be absorbed, can be introduced into the absorption vessel 1 at a pressure of e.g. 0.3 Torr.

In the first stage 3 of the absorption vessel the medium is brought into contact in counter current, with a 65% sulphuric acid solution which, via a sulphuric acid inlet pipe 4 and a spray nozzle 5, can be introduced into the upper part of the stage 3. In this first stage 70 to 80 percent of the total quantity of water to be absorbed, is absorbed while the sulphuric acid solution supplied has a temperature of −9°C. After use, the sulphuric acid solution can be discharged, via the discharge pipe 6, from the absorption vessel 3 and be passed on by means of a pump 7, to a heat exchanger which is provided with a cooling medium inlet 9 and a cooling medium outlet 10. Finally the sulphuric acid can be returned via the inlet pipe 4. In order to discharge a part of the diluted sulphuric acid the recycling conduit is provided with a discharge pipe 11, while via inlet 12 a sulphuric acid with a higher concentration can be supplied in order to maintain the desired concentration of the solution. The quantity of concentrated sulphuric acid supplied is rather small relative to the circulation output. The steam containing medium can leave the first stage 3 via the upper side 13 and flow to the second stage 14. In this stage, too, the sulphuric acid can be fed via the upper pipe 15 and sprayed through a second nozzle 16. This sulphuric acid has, however, a concentration of 90 percent. The absorption in this second stage takes place at a temperature of about +12°C. The sulphuric acid used in this stage is discharged on the underside via discharge pipe 17. A small part of the sulphuric acid discharged via this pipe is, via the inlet 12, introduced into the recycling conduit of the first stage, while the rest via pump 18 and heat exchanger 19, can be returned to nozzle 16 at the upper end of the second stage. In the suction pipe of pump 18 a feed pipe 20 is disposed for feeding a concentrated sulphuric acid solution, like e.g. a 96% sulphuric acid or even oleum.

The non-condensable components of the steam containing medium leave the second stage at the upper end thereof via a strap 21 for removing small liquid particles from the gas stream and are passed through a pipe 23 to a gas blower 24; a small gas blower with a small quantity of driving steam suffices.

In the following survey are indicated some data concerning the quantity of water which can be absorbed at different pressues by a particular quantity of sulphuric acid of a particular concentration. It should be noted that this is only a rough indication, since the water acid ratio does not only depend on the pressure used but also on the number of stages in the apparatus and the temperature at which the absorption is effected.

In the survey the weight of the water vapor which can be absorbed per unit of acid is mentioned.

| Pressure in the system (Torr) | Water/acid ratio kg/hkg |
| --- | --- |
| 0.02 | 0.2 |
| 0.4 | 0.4 |
| 1.4 | 0.6 |
| 2.4 | 0.8 |
| 3.6 | 1.0 |
| 5.2 | 1.6 |
| 7 | 2 |
| 8 | 4 |
| 10 | 10 |

It appears from this survey that even at a very low pressure the quantity of acid required for the absorption of a particular quantity of water is passable, while it should be further noted that at very low pressures little stripper steam for stripping the oils is required.

In FIG. 1 the reference numerals with ' correspond to similar reference numerals indicating similar parts or flows of the second vessel which is connected in series with the first vessel.

Medium flowing from the absorption vessel 1 is passed on, by means of blower 24, to the absorption vessel 1' where the same absorption takes place.

Other absorption vessels can be disposed beyond the second absorption vessel 1' a blower being present between subsequent absorption vessels. In this way remarkable advantages are obtained.

The medium issuing from absorption vessel 1' is introduced, together with the non-condensable products, via the steam jet pump 25, into condensor 27.

In FIG. 2 is indicated that via overflow 26 sulphuric acid can likewise flow off to the next absorption stage. In that case this overflowing sulphuric acid can be used as an absorption solution, while the pipe 17 may be omitted.

The sulphuric acid flowing from the absorption stage 3 of the first vessel can via the pipe 11 be passed to the fresh sulphuric acid feeding nozzle 16' of the stage 14' of the second vessel.

What I claim is:

1. In a procedure for deacidulation and deodorization of edible oil by means of stripper steam, a method of removing water vapor from the stripper steam after deacidulation and deodorization comprising the steps of:
   a. contacting the steam in a first stage with finely divided sulphuric acid in a region at a pressure lower than 4 mm of mercury,
   b. recycling the sulphuric acid and extracting heat from it during the recycling step,
   c. moving the steam by means of a blower from the first stage to a second stage,
   d. contacting the same steam in the second stage with finely divided sulphuric acid of higher concentration in a region at a pressure lower than 4 mm of mercury,
   e. recycling the sulphuric acid of the second stage and extracting heat from it during the recycling step,
   f. adding sulphuric acid from the second stage to the sulphuric acid of the first stage,
   g. moving the steam by means of a steam jet from the second stage to a condenser, and
   h. condensing the steam.

2. A method as defined in claim 1 wherein the regions in which the steam is contacted by the sulphuric acid is at a pressure between 0.01 and 1.0 Torr and a temperature between −10°C and 50°C.

3. A method as defined in claim 1 wherein 70 to 80 percent of the water vapor to be removed from the steam is removed in the first stage.

4. A method as defined in claim 1 wherein the sulphuric acid from the second stage is added to the sulphuric acid of the first stage at a rate just sufficient to maintain the concentration of the sulphuric acid of the first stage constant.

5. In an installation for deacidulation and deodorization of edible oil by means of stripper steam, apparatus for removing water vapor from the stripper steam after deacidulation and deodorization, comprising:
   a. at least two absorption vessels,
   b. means for spraying finely divided sulphuric acid through a nozzle into each vessel,
   c. a sulphuric acid recycling circuit for each vessel, each said circuit including means for extracting heat from the sulphuric acid being recycled,
   d. an inlet and outlet in each vessel through which steam to be treated flows into and out of the vessel,
   e. a blower between said two absorption vessels for moving the steam from the outlet of one vessel to the inlet of the next succeeding vessel,
   f. a condenser, and
   g. a steam jet pump for moving the steam from the outlet of the last vessel to said condenser.

6. An installation as defined in claim 5 including means for introducing sulphuric acid of a higher concentration into each sulphuric acid recycling circuit.

7. An installation as defined in claim 5 including means for spraying sulphuric acid into each vessel through at least two spaced apart nozzles, means within each vessel for causing the steam to move past each of said nozzles in succession, a separate sulphuric acid recycling circuit for each spraying means, and means for introducing sulphuric acid from one of said circuits into the circuit of a preceeding nozzle.

8. An installation as defined in claim 5 including means for discharging dilute sulphuric acid from each recycling circuit, and means connecting the discharge means of the first vessel through which steam moves to the spray means of the second vessel.

* * * * *